(12) United States Patent
Tanaka

(10) Patent No.: US 8,576,803 B2
(45) Date of Patent: Nov. 5, 2013

(54) COMMUNICATION SYSTEM

(75) Inventor: Toyohisa Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 222 days.

(21) Appl. No.: 12/600,900

(22) PCT Filed: Jun. 1, 2007

(86) PCT No.: PCT/JP2007/061158
§ 371 (c)(1),
(2), (4) Date: Nov. 19, 2009

(87) PCT Pub. No.: WO2008/146402
PCT Pub. Date: Dec. 4, 2008

(65) Prior Publication Data
US 2010/0150068 A1 Jun. 17, 2010

(51) Int. Cl.
*H04W 4/00* (2009.01)
(52) U.S. Cl.
USPC ............................................................ 370/334
(58) Field of Classification Search
USPC ................................. 370/310–350, 203–211
See application file for complete search history.

(56) References Cited

U.S. PATENT DOCUMENTS

| 6,067,290 | A | 5/2000 | Paulraj et al. |
| 6,311,075 | B1 * | 10/2001 | Bevan et al. ............... 455/562.1 |
| 2002/0115474 | A1 | 8/2002 | Yoshino et al. |
| 2005/0174954 | A1 * | 8/2005 | Yun et al. ..................... 370/310 |
| 2005/0201328 | A1 | 9/2005 | Moon et al. |
| 2006/0009244 | A1 * | 1/2006 | Schacht et al. ............... 455/500 |
| 2006/0209732 | A1 * | 9/2006 | Gorokhov et al. ............ 370/310 |
| 2006/0270341 | A1 * | 11/2006 | Kim et al. .................... 455/16 |
| 2006/0280116 | A1 * | 12/2006 | Ji et al. ......................... 370/210 |

(Continued)

FOREIGN PATENT DOCUMENTS

| GB | 2 367 455 A | 4/2002 |
| GB | 2 378 858 A | 2/2003 |

(Continued)

OTHER PUBLICATIONS

"IEEE Standard for Local and Metropolitan Area Networks Part 16: Air Interface for Fixed Broadband Wireless Access Systems", IEEE Std. 802.16$^{tm}$ pp. 502-505 8.4.4.4 Allocation of subchannels for FCH, and logical subchannel numbering (Oct. 1, 2004).

(Continued)

*Primary Examiner* — Charles C Jiang
(74) *Attorney, Agent, or Firm* — Oblon, Spivak, McClelland, Maier & Neustadt, L.L.P.

(57) ABSTRACT

A communication system includes sector units composing base stations, and mobile subscriber stations each being in sectors corresponding to the sector units. The mobile subscriber stations transmit channel estimation signals to the sector units corresponding to the sector and sector units corresponding to sectors contiguous to the sectors. A sector unit that corresponds to the sector forms, based on a channel estimation signal received from the mobile subscriber station in the sector corresponding to the sector unit and channel estimation signals received from the adjacent mobile subscriber stations in the sectors contiguous to the sector, a transmission beam that is directed to the mobile subscriber station but is not directed to the adjacent mobile subscriber stations to transmit data to the mobile subscriber station. By configuring the system in such a manner, interference from contiguous sectors can be avoided.

12 Claims, 8 Drawing Sheets

(56) References Cited

U.S. PATENT DOCUMENTS

| | | | |
|---|---|---|---|
| 2007/0177501 A1* | 8/2007 | Papasakellariou | 370/229 |
| 2008/0026763 A1* | 1/2008 | van Rensburg et al. | 455/446 |
| 2008/0090575 A1* | 4/2008 | Barak et al. | 455/444 |
| 2008/0165866 A1* | 7/2008 | Teo et al. | 375/260 |
| 2008/0267142 A1 | 10/2008 | Mushkin et al. | |

FOREIGN PATENT DOCUMENTS

| | | |
|---|---|---|
| JP | 2002 077015 | 3/2002 |
| JP | 2002 319894 | 10/2002 |
| JP | 2004-80191 A | 3/2004 |
| JP | 2005 204321 | 7/2005 |
| JP | 2006 197639 | 7/2006 |
| WO | WO 2005/048485 A1 | 5/2005 |
| WO | WO 2005/122696 A2 | 12/2005 |

OTHER PUBLICATIONS

"IEEE Standard for Local and Metropolitan area Networks Part 16: Air Interface for Fixed and Mobile Broadband Wireless Access Systems Amendment 2 and Corrigendum 1", IEEE Std 802-16e-2005 and IEEE Std 802.16/2004/Cor1-2005, pp. 563-564 8.4.6.3.3. AMC support for SDMA (Feb. 28, 2006).

Japanese Office Action issued on May 10, 2011 in corresponding Japanese Application No. 2008-558050 (with a Partial English Translation).

Chinese Office Action mailed on Jun. 5, 2012, issued for Chinese Application No. 2007-80052753.5 (with Partial English translation).

The Extended European Search Report issued Nov. 22, 2012, in Application No. / Patent No. 07744546.8-2412 / 2154795 PCT/JP 2007061158.

Choong Il Yeh, et al., "Closed-loop downlink switched beam selection", Vehicular Technology Conference, vol. 1, XP010878487, Sep. 28, 2005, pp. 345-348.

Office Action issued Dec. 25, 2012, in Japanese Patent Application No. 2011-238405 with partial English translation.

Office Action issued Apr. 23, 2013 in Japanese Patent Application No. 2011-238405 with partial English language translation.

Office Action issued Sep. 10, 2013 in Japanese Patent Application No. 2011-238405 (with Partial English Translation).

\* cited by examiner

COMMUNICATION SYSTEM

TECHNICAL FIELD

The present invention relates to a communication system which includes a plurality of base stations and mobile subscriber stations in areas corresponding to the base stations. For example, the present invention relates to a communication system used for a land mobile communication system having a cellular configuration—to which Mobile WiMAX (Worldwide Interoperability for Microwave Access) system or the like is applied, and especially relates to a wireless communication system in which the same frequencies are used while their mutual interferences are being avoided.

BACKGROUND ART

In a wireless communication system such as a cellular system which expands its service over wide area, it is necessary to ensure that every base station (Base Station: BS) communicates independently of its adjacent base stations. Thus, conventionally applied is a method such as using different frequencies, different spreading codes, or different time domains. In recent years, an OFDM (Orthogonal Frequency Division Multiplexing) method has been standardized as IEEE802.16e (Mobile WiMAX), in which a usable frequency band is divided into narrow and orthogonal subcarrier frequency bands for communication. In the Mobile WiMAX system, provided that independently separated subcarriers are allocated, the same frequency band is used in contigubus sectors (refer to Non patent document 1).

An FDMA (Frequency-division multiple access) method using different frequencies is obviously disadvantageous in a view point of frequency utilization efficiency. In a CDMA (Code-division multiple access) method using the same frequencies with spreading codes, communication capacity is reduced because of the interference by signals from contiguous sectors. In a Mobile WiMAX system, a heavier communication load increases collision probability, causing the interference effect over its negligible level.

In a Mobile WiMAX system, an adaptive array system (AAS) using a multi-antenna is standardized (refer to Non patent document 2). Depending on a flexibility of the antenna, the interference to mobile subscriber stations (Mobile Subscriber Station: MSS) in its own sector can be prevented. However, no attention is paid to avoid interference to mobile subscriber stations in sectors contiguous to the own sector.

Non-Patent Document 1:IEEE 802.16-2004 (8.4.4.4 Allocation of subchannels for FCH, and logical subchannel numbering)

Non-Patent Document 2:IEEE 802.16-2004/Cor 1-2005 (8.4.6.3.3 AMC support for SDMA)

Patent Document 1:Japanese Patent Laid-Open No. 2002-319894

Patent Document 2:U.S. Pat. No. 6,067,290

DISCLOSURE OF INVENTION

Problems to be Solved by the Invention

As described above, the cellular system or the like does not include a technique that can address, at the same time, all issues of enhancing usability by using a single frequency band, improving frequency utilization efficiency, and avoiding interference from other sectors, and thus the system is established based on trade-offs among these issues.

The present invention is made to provide a communication system that can avoid interference from the contiguous areas.

Means for Solving Problems

A communication system according to the present invention includes a plurality of base stations and mobile subscriber stations located respectively in areas corresponding to the plurality of base stations, wherein each mobile subscriber station in each area transmits a channel estimation signal to each base station corresponding to the area and to base stations corresponding to areas contiguous to the area, and the base station transmits data to the mobile subscriber station using a transmission beam that is directed to the mobile subscriber station and is not directed to the adjacent mobile subscriber stations, on the basis of the channel estimation signal received from the mobile subscriber station in an area corresponding to the base station and the channel estimation signals received from adjacent mobile subscriber stations in areas contiguous to the area corresponding to the base station.

Advantageous Effects

According to the present invention, interference from the contiguous areas can be avoided, and therefore, a mobile subscriber station can satisfactorily communicate with a base station corresponding to an area to which the subscriber station belongs, which greatly contributes to enhance frequency utilization efficiency.

BEST MODE FOR CARRYING OUT THE INVENTION

Embodiment 1

Figure 1:
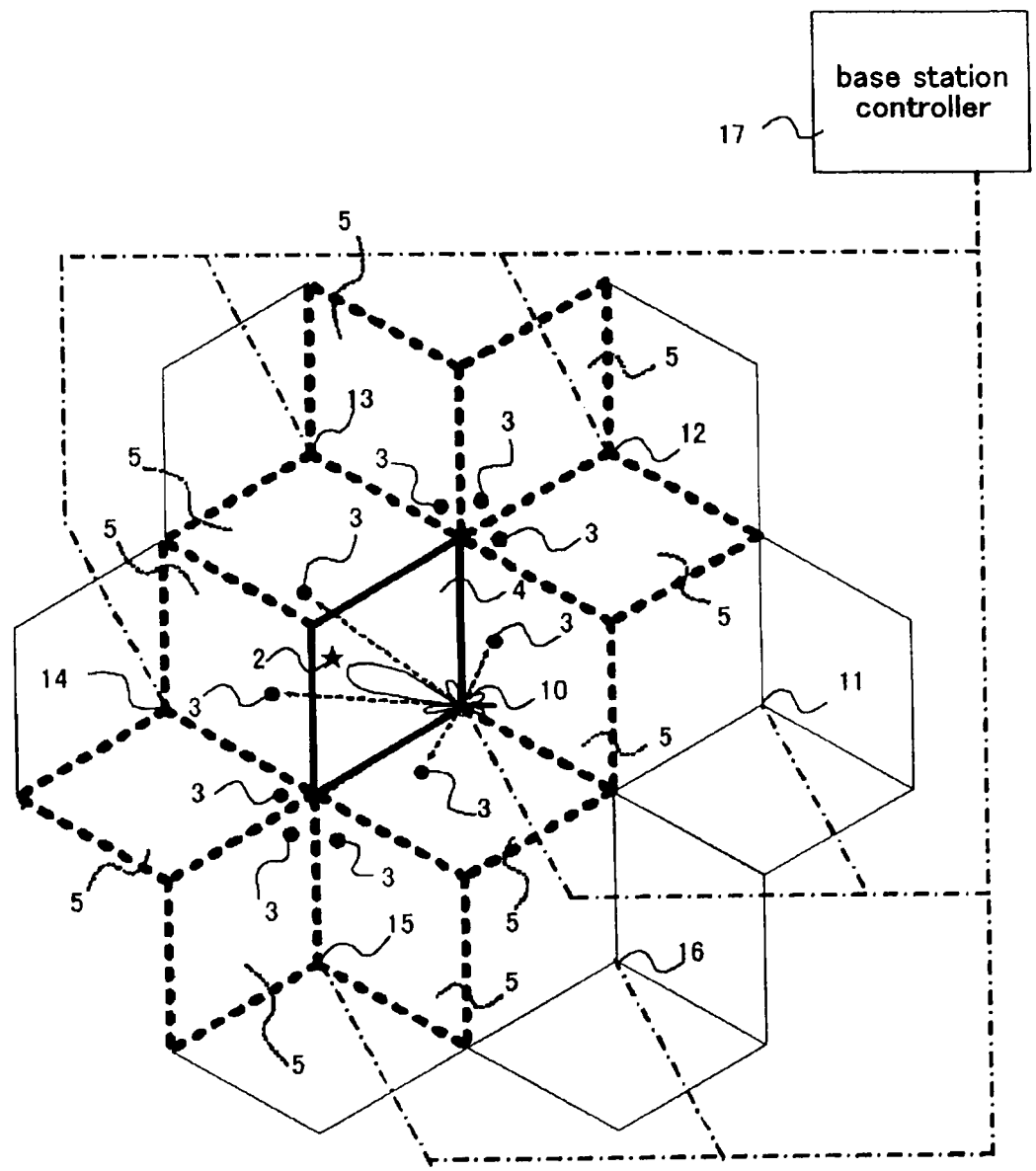
FIG. 1 is a view illustrating a configuration of a communication system of Embodiment 1 according to the present invention.

FIG. 1 is a view illustrating a configuration of a communication system of Embodiment 1 according to the present invention. The communication system has a configuration in which mobile subscriber stations 2 and 3, base stations 10 through 16, and a base station controller 17 are included. The mobile subscriber stations 2 and 3 are terminal devices carried by users and they wirelessly communicate, while being moved, with the base stations 10 through 16. Each of the base stations 10 through 16 is stationarily provided and has a communication area—called as a cell—around itself to wirelessly communicate with the mobile subscriber stations 2 and 3. Furthermore, each of the base station 10 through 16 includes three sector units that wirelessly communicate with the mobile subscriber stations 2 and 3 located in the sectors 4 and 5 that are areas defined by dividing the cell on a 120-degree-azimuth-angle basis. A base station controller 17 is a host device that controls the base stations 10 through 16.

Respective cells of the base stations 10 through 16 are drawn as hexagonal areas, at the centers of which the base stations 10 through 16 are located. Each hexagonal cell includes three sectors each of which is a rhombic area. Now, attention is directed to the sector 4 indicated as a rhombic area outlined by heavy lines. In the sector 4, the mobile subscriber station 2 (a filled star symbol) is located. Each of the sectors 5 contiguous to the sector 4 is indicated as a rhombic area outlined by heavy dotted lines. In the each of the contiguous sector 5, a mobile subscriber station 3 (a filled circle) is located. In a 3-sector configuration, the total number of contiguous sectors 5 is ten. When a sector unit of the base station 10 is to transmit data to the mobile subscriber station in the corresponding sector 4, the sector unit forms a transmission beam that is directed to the mobile subscriber station 2 but is not directed to the mobile subscriber stations 3 in the contiguous sectors 5. At the position of the base station 10, a transmission beam pattern in this situation is drawn. Formation of a beam pattern not directed to the mobile subscriber stations 3 is referred to as null-steering.

As described above, by forming a beam pattern that is directed to the mobile subscriber station 2 in the sector 4 and is not directed to the mobile subscriber stations 3 in the contiguous sectors 5 and transmitting data with the beam pattern, interference with the mobile subscriber stations 3 in the contiguous sectors 5 can be prevented.

Furthermore, what is referred to as "area" in the present invention may be a cell or a sector. If sectors are considered to be areas, each sector unit corresponding to its sector is considered to be a base station corresponding to its area.

In order to form a beam pattern that is directed to the mobile subscriber station 2 in the sector 4 and is not directed to the mobile subscriber stations 3 in the contiguous sectors 5, information which represents a transmission channel of the mobile subscriber station 2 in the sector 4 and information which represents transmission channels of the mobile subscriber stations 3 in the contiguous sectors 5 are required. Here, "a transmission channel of the mobile subscriber station 2" is a transmission channel between the mobile subscriber station 2 in the sector 4 and the sector unit corresponding to the sector 4. Similarly, "transmission channels of the mobile subscriber stations 3" are each a transmission channel between a mobile subscriber station 3 in a contiguous sector 5 and the sector unit corresponding to the sector 4. Such channel information can be obtained by transmitting channel estimation signals 8 from the mobile subscriber stations 2 and 3 to the base stations through 16 in uplink (Uplink; UL), and then estimating transmission channels on the basis of reception states of the signals at the base stations 10 through 16.

Figure 2:
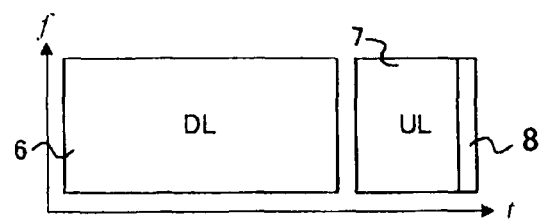
FIG. 2 is a view showing a format of a transmission frame.

FIG. 2 is a view showing a format of a transmission frame. The transmission frame includes a uplink frame 7 and a downlink frame 6. The channel estimation signal 8 is also referred to as an uplink sounding pilot symbol (UL Sounding pilot symbol) and added to the uplink frame 7.

Figure 3:
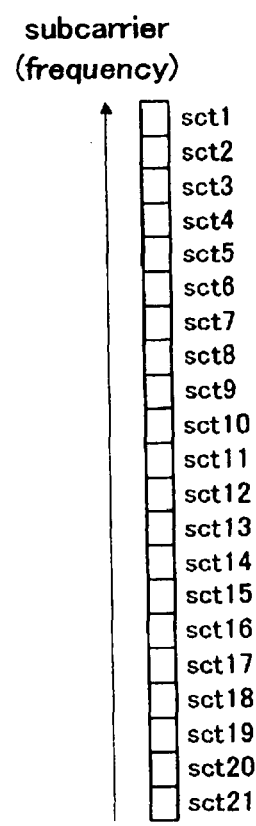
FIG. 3 a view showing a relation about how sectors correspond to subcarriers.

FIG. 3 is a view showing a relation about how the sectors correspond to the subcarriers. The channel estimation signals are transmitted by using subcarriers assigned to the respective sectors (scts 1 through 21). The subcarriers have different frequencies from each other. By using these subcarriers, the channel estimation signals can be transmitted and received on a sector basis, and channel estimations of the mobile subscriber stations can be performed.

For each subcarrier assigned on a sector basis, spreading codes are used to multiplex channel estimation signals for a plurality of mobile subscriber stations. Then, channel estimations can hereby be performed for each mobile subscriber station. In addition, spreading codes to be used include Walsh codes which are orthogonal to each other, Gold codes, or the like. Walsh codes have an upper limit to the number of codes orthogonal; therefore, if there are mobile subscriber stations whose number exceeds the upper limit, Gold codes are used to complement the upper limit. For example, when subcarriers are provided—it is taken into account that given subcarriers are repeatedly used in other areas—for 21 sectors=7 base stations ×3 sectors, channels of 1344 mobile subscriber stations can be estimated by using an FFT (fast Fourier transform) size of 2096 and a spreading factor of 64.

Figure 4:
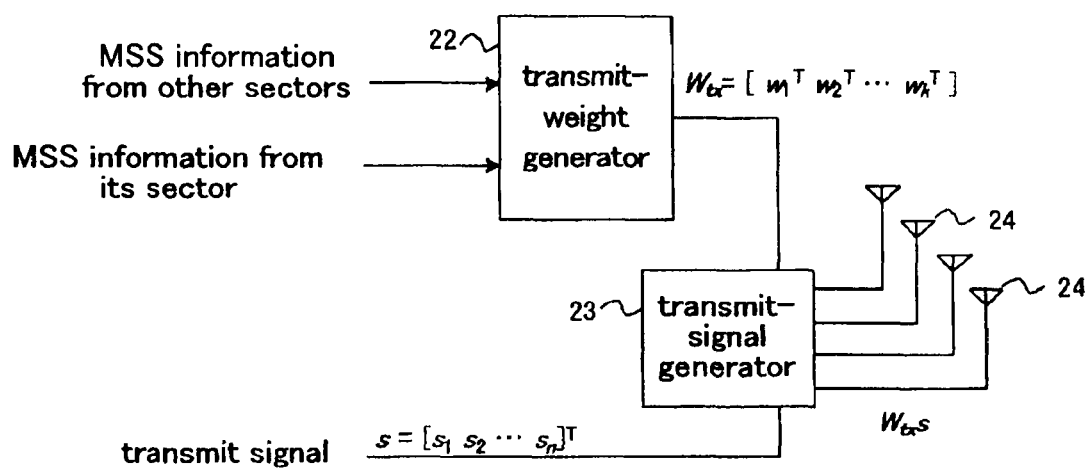
FIG. 4 is a block diagram showing a configuration of a transmit unit in a sector unit.

FIG. 4 is a block diagram illustrating a configuration of a transmit unit in the sector unit. The transmit unit in the sector unit includes a, a weight generator 22, a transmit-signal generator 23, and an antenna 24. All sector units are time-synchronized and controlled to have the same transmit/receive timings in the cellular system including the plurality of base stations. The sector unit receives channel estimation signals (Mobile Sounding symbol; MSS) transmitted from mobile subscriber stations in the same sector of the unit and those from other sectors as well. The received channel estimation signals are converted to those in the frequency domain and are de-spread on a sector-assigned-subcarrier basis, so that channel estimations are achieved.

Next, details of the number of antenna elements in a transmit antenna is now explained. A transmit antenna 24 is a multi-antenna including a plurality of antenna elements. Supposing that, at a certain symbol timing, the number of mobile subscriber stations performing communication in the same sector is k (a natural number) and that of mobile subscriber stations under communicable state in other sectors is m (a natural number), it is necessary that the antenna element number n (a natural number) be n=(k+m).

In the downlink communication according to IEEE802.16e, subcarriers and symbols are allocated for a mobile subscriber station. Regarding mobile subscriber stations that are located in the sectors contiguous to the same sector and in service at the same symbol timings as that in the same sector, base stations obtain information of scheduled transmission timings in advance. According to such transmit timing information, combinations of the mobile subscriber stations are recognized with respect to every symbol timing, so that transmit weight for downlink is generated for respective combinations.

Next, a method for generating transmit weight for downlink is now explained. Here, a method is used as an example in which the weight is calculated based on an MMSE (Minimum Mean Square Error) criterion using channel information obtained by the channel estimation. In the method, according to the scheduling information announced by the base station controller, specific combinations are presumed for k mobile subscriber stations under communication in the same sector and m mobile subscriber stations under communication in the other sectors. Then, the transmit weight can be calculated by a mathematical formula (1) shown below.

[Formula 1]

$$W=(H^{*}H^{T}+\sigma^{2}/P^{I})^{-1}H^{*} \qquad (1)$$

Here, "*" denotes the conjugate operator for a matrix and "T" denotes the transpose operator for a matrix; σ is an average noise power, P is a transmission power, and I is a unit matrix having n rows and n columns; a channel matrix H is expressed by Formula (2) shown below.

[Formula 2]

$$H = \begin{bmatrix} h_{11} & \cdots & h_{1k} & h_{1(k+1)} & \cdots & h_{1(k+m)} \\ \vdots & \ddots & \vdots & \vdots & \ddots & \vdots \\ h_{i1} & \cdots & h_{ik} & h_{i(k+1)} & \cdots & h_{i(k+m)} \\ \vdots & \ddots & \vdots & \vdots & \ddots & \vdots \\ h_{n1} & \cdots & h_{nk} & h_{n(k+1)} & \cdots & h_{n(k+m)} \end{bmatrix} \quad (2)$$

In actual transmission; first to k-th columns of the transmit weight matrix are multiplied by a transmit symbol vector, which gives respective antennas' transmit signals $X^T$ to be transmitted toward the k mobile subscriber stations under communication in the same sector.

[Formula 3]

$$X^T = W_{n \times k} S^T \quad (3)$$

Here, a transmit vector S is expressed as $S=[s_1 \ldots s_k]$. In addition, the transmit weight may be calculated by other methods such as a ZF method.

Figure 5:
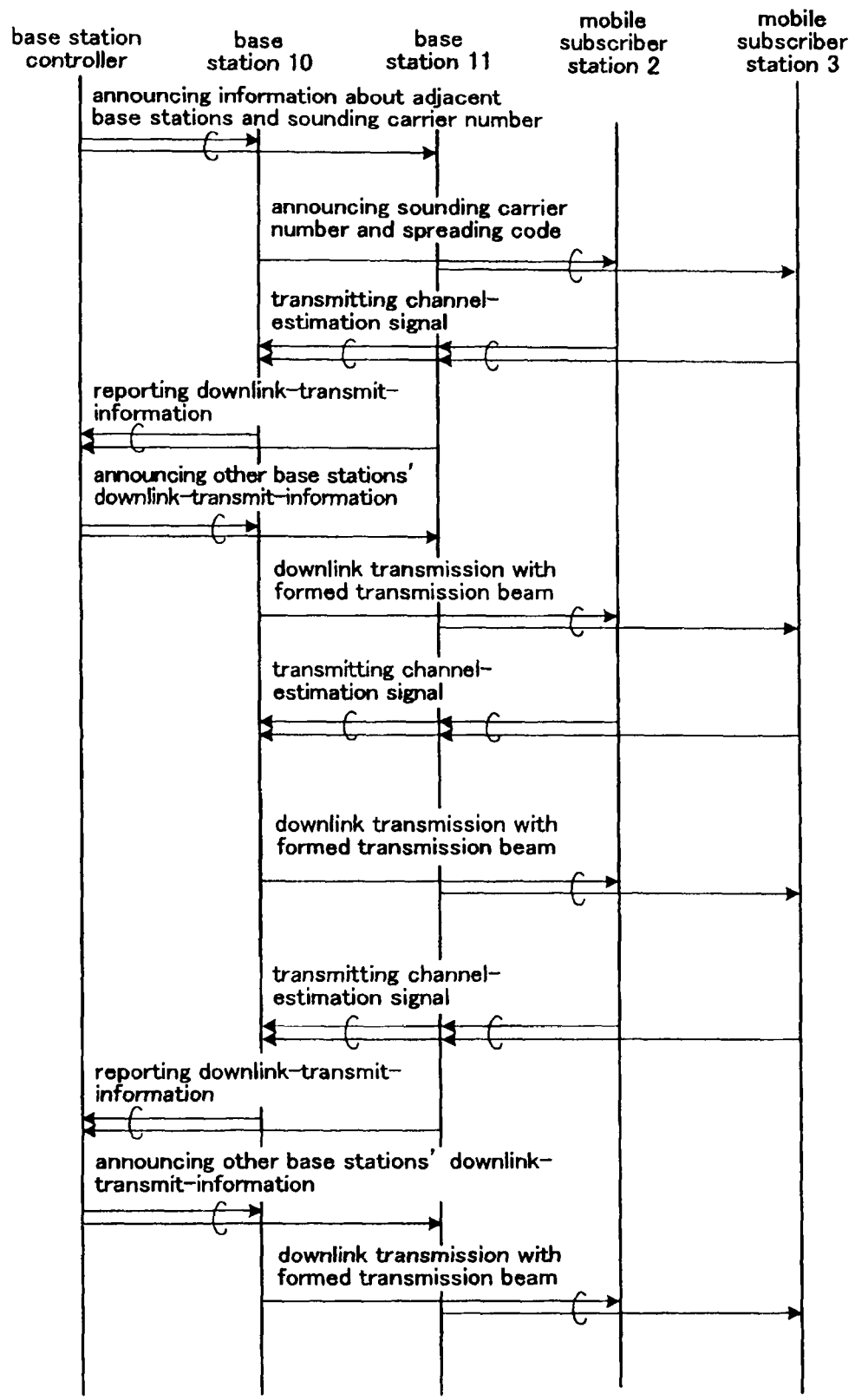
FIG. 5 is a control flow chart that illustrates a procedure for interference avoidance control.

FIG. 5 is a control flow chart that illustrates a sequence of an interference avoidance control. When a location of a mobile subscriber station is registered or a mobile subscriber station starts to communicate, the base station controller informs respective base stations of information about adjacent base stations and a sounding carrier number corresponding to the mobile subscriber station.

Receiving the information, each base station informs mobile subscriber stations in its sector of a sounding carrier number and spread code numbers. Receiving these numbers, each mobile subscriber station uses the sounding carrier thus specified to transmit a channel estimation signal.

Next, the each base station transmits to the base station controller, its downlink-transmit-scheduling information. Receiving the information from respective base stations, the base station controller transmits to each of the base stations, downlink-transmit-scheduling information with respect to the other base stations adjacent to the each of the base stations. Each base station uses the downlink-transmit-scheduling information with respect to the other base stations adjacent to the base station and the channel information of mobile subscriber stations, to form a downlink transmission beam that is not directed to the mobile subscriber stations in the other sectors.

Thereafter, it is repeated at regular intervals that each mobile subscriber station transmits its channel estimation signal and each base station transmits its downlink-transmit-scheduling information to the base station controller. When the downlink-transmit-scheduling information is changed, the base station controller informs respective base stations of the information.

According to this sequence, a beam pattern for downlink transmission can systematically be generated.

Figure 6:
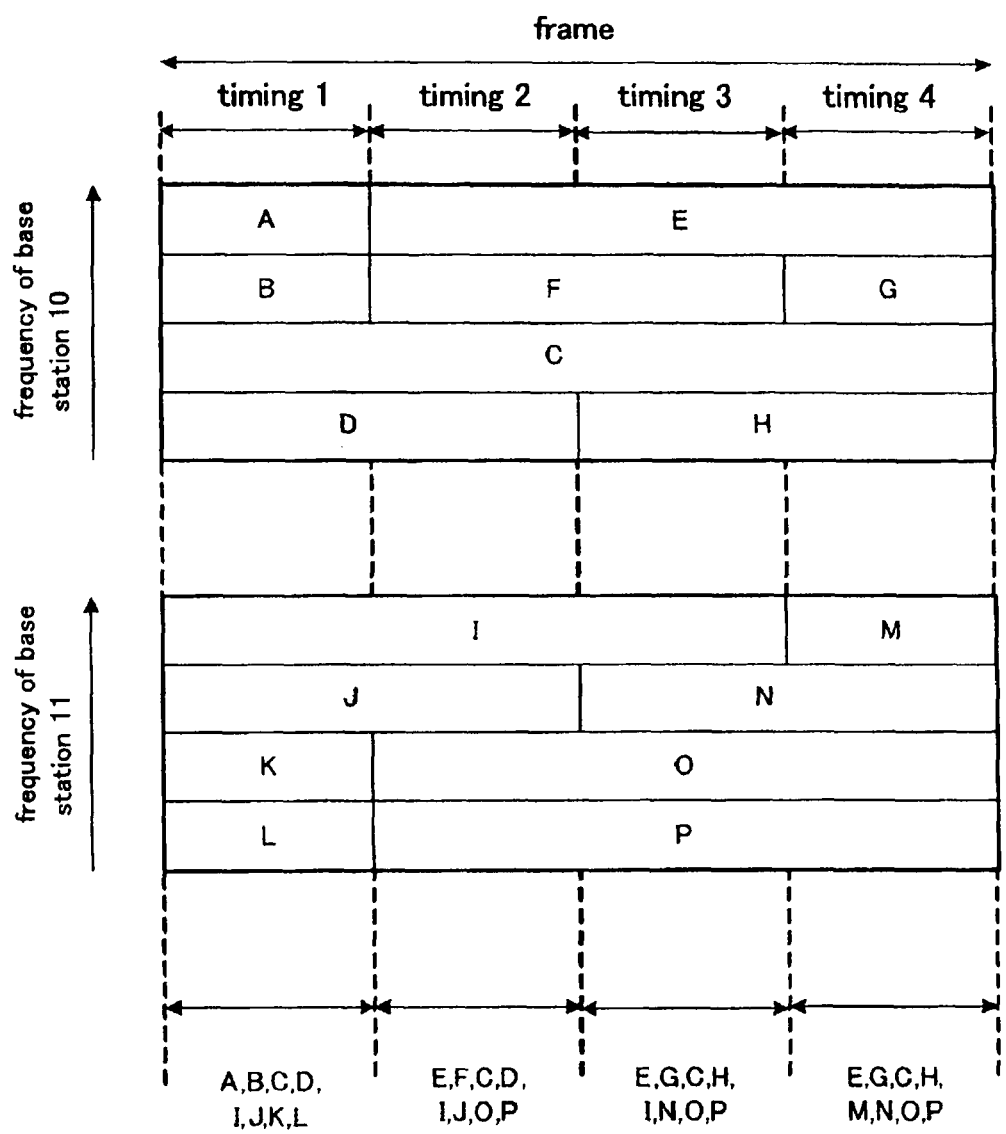
FIG. 6 is a view that shows examples of frame configurations, in which combinations of mobile subscriber stations are taken into account.

FIG. 6 is a view that shows examples of frame configurations, in which combinations of mobile subscriber stations are taken into account. Mobile stations in a cell corresponding to the base station 10 are denoted by numerals "A" through "H", and those for mobile stations in a cell corresponding to the mobile subscriber station 11 are denoted by numerals "I" through "P". The scheduling information from the base station controller includes information about which mobile subscriber station each base station communicates wirelessly with, on a time-divided-frame timing basis. During the timing 1, the mobile subscriber stations A, B, C, and D communicate with the base station 10, and the mobile subscriber stations I, J, K, and L communicate with the base station 11. This combination is determined by the respective base stations, which calculate transmit weights, using channel information that is estimated on the basis of sounding carriers transmitted from the mobile subscriber station A through D and I through L. For example, when the base station 10 is to communicate with the mobile subscriber station A, the base station forms a transmission beam pattern that is directed to the mobile subscriber station A but is not directed to other mobile subscriber stations—the mobile stations B through D and I through K.

In addition, "downlink transmission with formed transmission beam" in FIG. 5 expresses collectively a series transmission of formed transmission beams each corresponding to combinations of mobile subscriber stations shown in FIG. 6.

In order to be capable of determining at every symbol timing, which mobile subscriber station to communicate with and which mobile subscriber station to give no interference to, it is necessary to time-synchronize the base stations. At a timing at which the combination of mobile subscriber stations is changed, the base stations form transmission beams according to the combination of the mobile subscriber stations to change their beams' directionalities.

As described above, the base station obtains channel information of mobile subscriber stations in the contiguous sectors and forms its transmission beam according to the combination that is depending on communication states in respective sectors at each symbol timing, whereby a communication system having no mutual interference can be configured.

Figure 7:
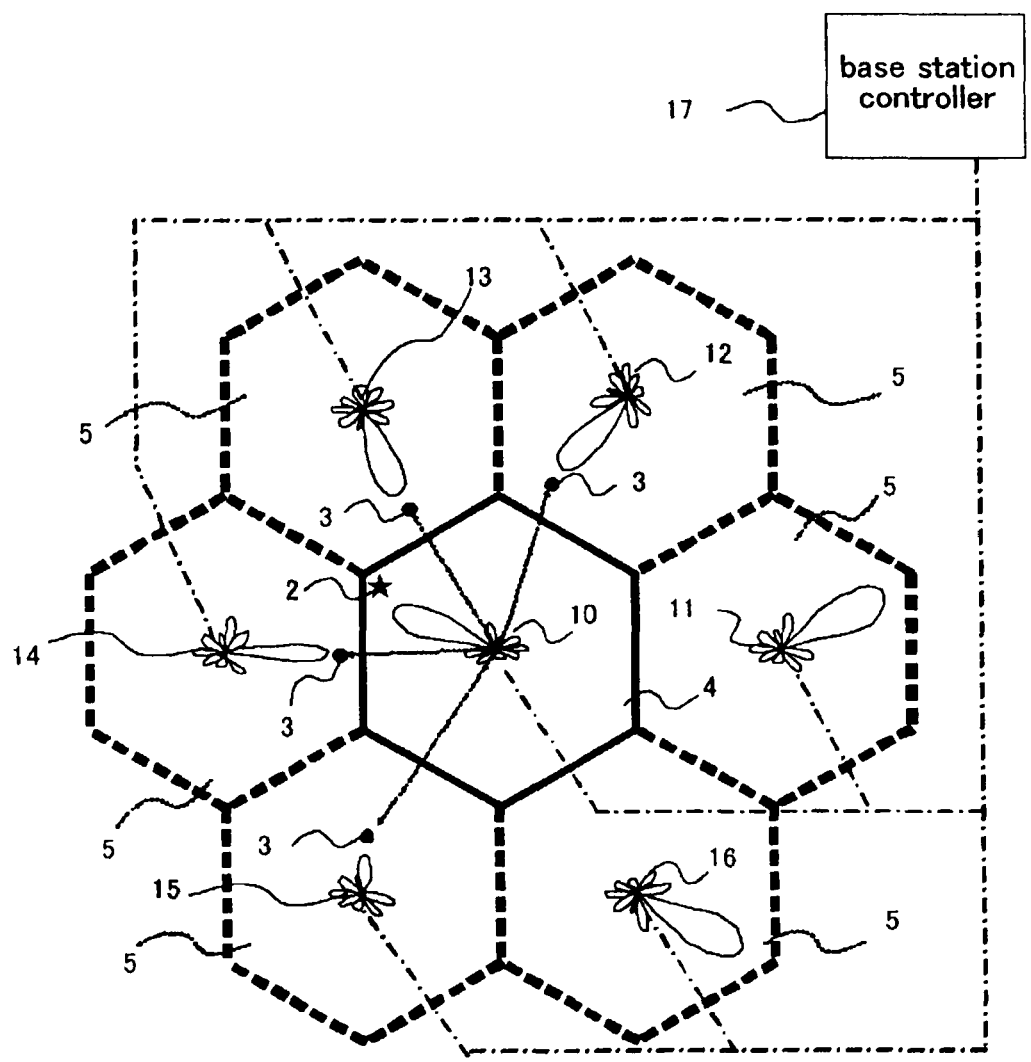
FIG. 7 is a view explaining a communication system that performs interference control on a cell basis.

FIG. 7 is a view for explaining a communication system that performs interference control on a cell basis. Respective cells corresponding to base stations 10 through 16 are illustrated as hexagonal areas, and each of the base stations 10 through 16 is arranged at the center of the cell. Attention will be focused on a cell 4—a hexagonal area outlined by heavy lines. The cell 4 includes a mobile subscriber station 2 (a filled star symbol). Contiguous to the cell 4 are cells 5, illustrated as hexagonal areas outlined by dotted lines. Mobile subscriber stations 3 (shown by filled circles) are each located in the contiguous cells 5.

In this configuration, the total number of the contiguous cells 5 with respect to the cell 4 is six. Thus, to transmit channel estimation signals, seven subcarriers are sufficient. If an FFT size of 2096 is used with a spreading factor of 256, channel estimation signals in a sector can be transmitted toward up to 256 mobile subscriber stations.

As described above, the present invention is usable regardless of arrangement of areas—such as sectors or cells—corresponding to the base stations.

Embodiment 2

Figure 8:
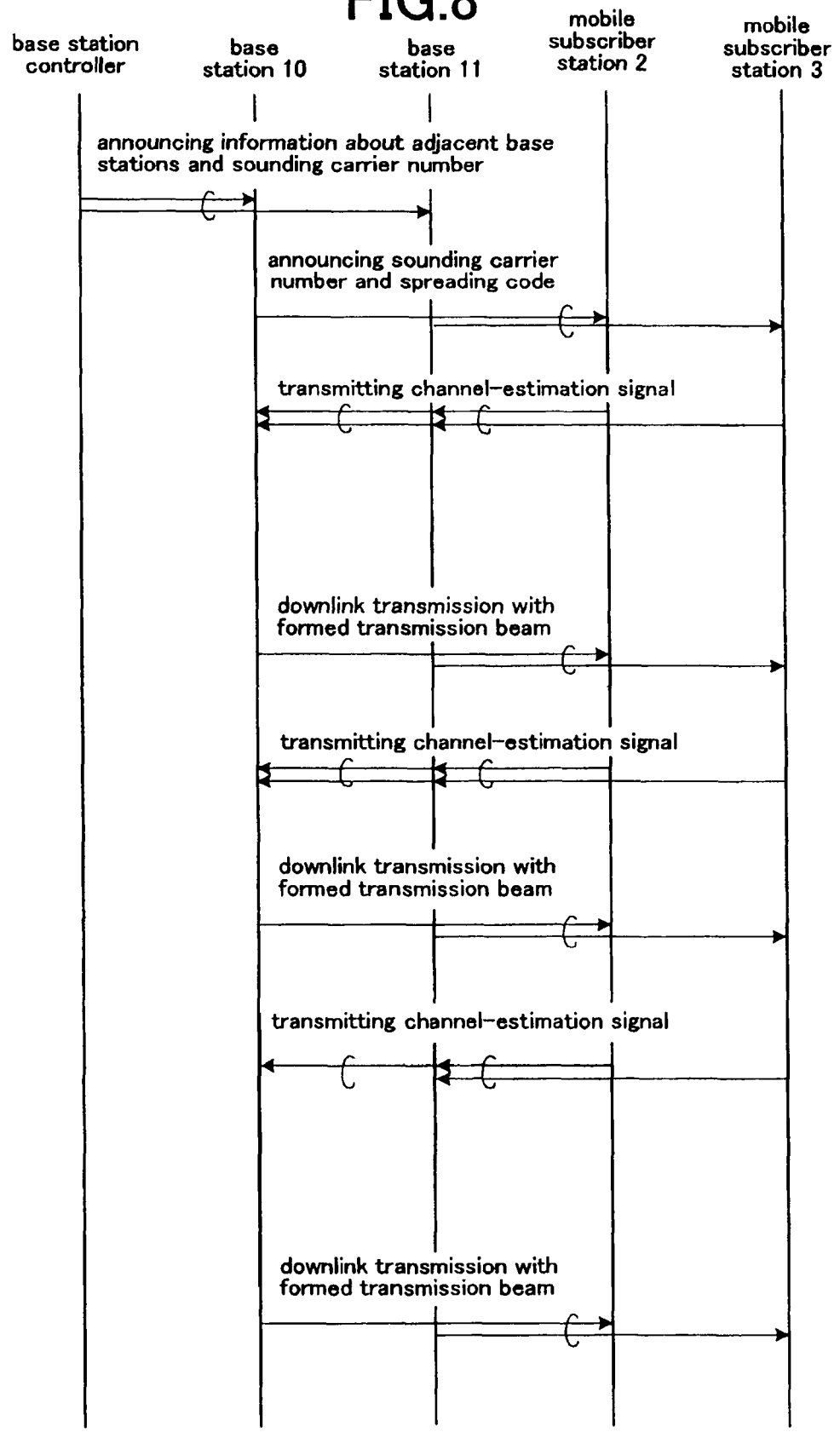
FIG. 8 is a control flow chart that illustrates a procedure of interference avoidance control of Embodiment 2 according to the present invention.

FIG. 8 is a control flow chart that illustrates a sequence of an interference avoidance control of Embodiment 2 according to the present invention. When a location of a mobile subscriber station is registered or a mobile subscriber station starts to communicate, the base station controller informs respective base stations of information about adjacent base stations and a sounding carrier number corresponding to the mobile subscriber station. Receiving the information, each base station informs mobile subscriber stations in its sector of a sounding carrier number and spread code numbers. Receiving the numbers, each mobile subscriber station uses the sounding carrier to transmit a channel estimation signal.

Each base station selects mobile subscriber stations according to reception levels of channel estimation signals from mobile subscriber stations in the other sectors, at every divisional timing of the wireless frame on time-division basis at which the combination of mobile subscriber stations under transmission in the same sector is to be changed. More specifically, selected are m mobile subscriber stations whose reception levels are in the top m. Here, a formula shown below gives m, using the number n of transmit antennas of a base station and the number k of mobile subscriber stations communicating at given timings in the base station's sector.

$$m=n-k-1 \quad (4)$$

A transmit weight is determined by applying an algorithm such as Formulas (1) through (3) where channel information of mobile subscriber stations to be communicated with a base station in its own sector and channel information of mobile subscriber stations selected among other sectors are used.

As described above, a transmission beam pattern is formed so that its beam is not beam-formed toward the m mobile subscriber stations in the other sectors which cause large interference, which provides a system in which the base station can communicate with mobile subscriber stations in its sector without giving interference.

Embodiment 3

Figure 9:
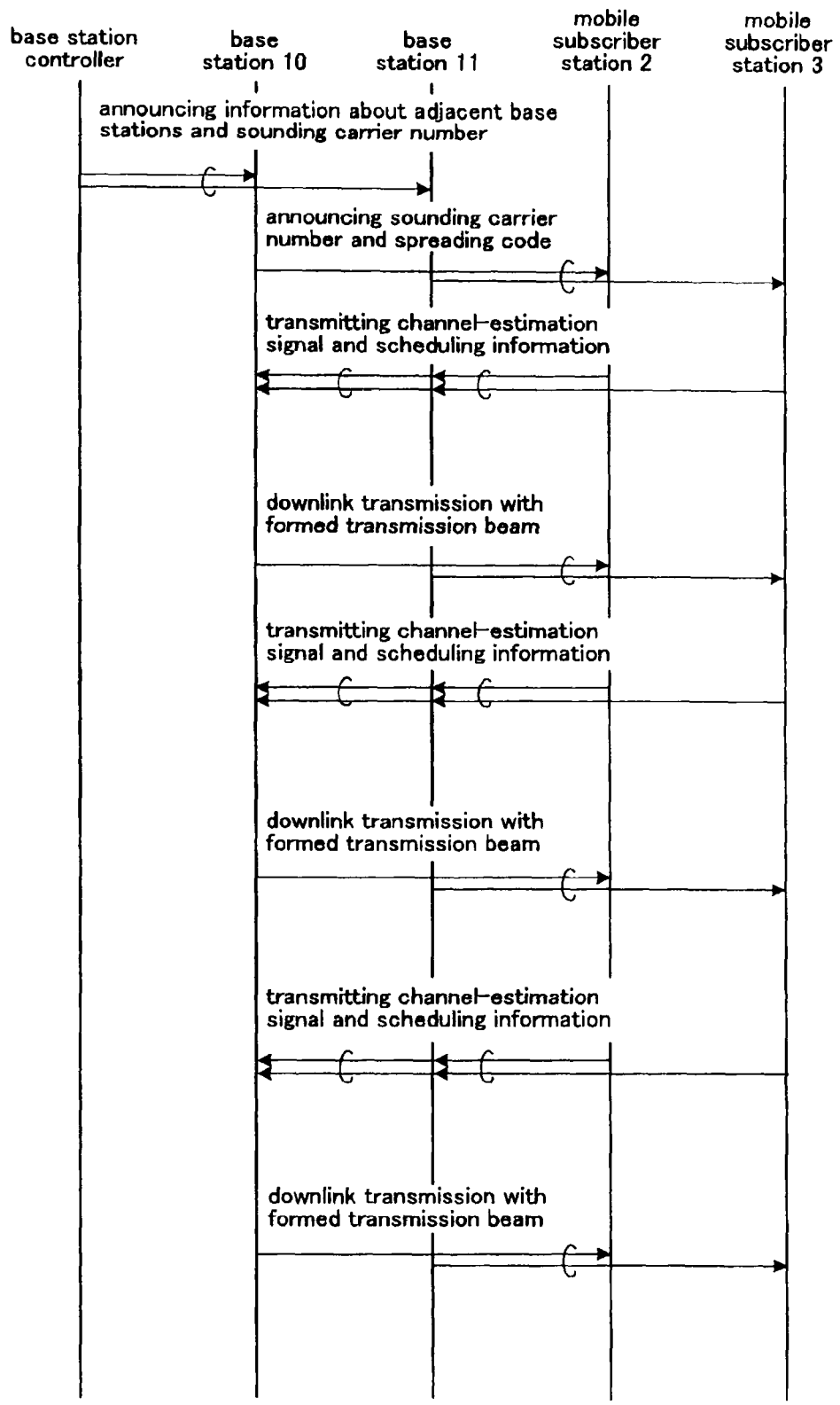
FIG. 9 is a control flow chart that illustrates a procedure of interference avoidance control of Embodiment 3 according to the present invention.

FIG. 9 is a control flow chart that illustrates a procedure of interference avoidance control of Embodiment 3 according to the present invention. When a location of a mobile subscriber station is registered or a mobile subscriber station starts to communicate, the base station controller informs respective base stations of information about adjacent base stations and a sounding carrier numbers corresponding to the mobile subscriber station. Receiving the information, each base station informs mobile subscriber stations in its sector of a sounding carrier number and spread code numbers. Receiving these numbers, each mobile subscriber uses the sounding carrier and the like to transmit a channel estimation signal and scheduling information.

Channel estimation signals and scheduling information can be transmitted from a lot of mobile subscriber stations, for example, by transmitting known pilot information and scheduling information spread by a spreading-code method.

Based on the scheduling information received from mobile subscriber stations in the other sectors, each base station determines transmit weight, taking into account the combination of mobile subscriber stations in the other sectors and those in its own sector, by an algorithm such as Formulas (1) through (3), at every divisional timing of the wireless frame on time-division basis at which the combination of mobile subscriber stations under transmission is to be changed.

As described above, the base station is informed of scheduling information from the mobile subscriber stations, which results in simplified procedure and prompt transmission of the scheduling information as well. Therefore, transmission beam patterns can be formed quickly without delay.

What is claimed is:

1. A communication system comprising:
a plurality of base stations; and
mobile subscriber stations located respectively in areas corresponding to the plurality of base stations,
wherein each mobile subscriber station in each area transmits a channel estimation signal to each base station corresponding to the area and to base stations corresponding to areas contiguous to the area, and each of the base stations transmits data to the mobile subscriber stations using a transmission beam that is directed to the mobile subscriber stations in the corresponding area and is not directed to adjacent mobile subscriber stations in the areas contiguous to the corresponding area, the data being transmitted by the base stations to the mobile subscriber stations on the basis of
the channel estimation signal received from the mobile subscriber station in an area corresponding to the base station,
the channel estimation signals received from the adjacent mobile subscriber stations in the areas contiguous to the area corresponding to the base station that are outside of the area corresponding to the base station, and
an interference amount at the adjacent mobile subscriber stations in the areas contiguous to the area corresponding to the base station.

2. The communication system according to claim 1, wherein the mobile subscriber stations use a carrier frequency assigned to the each area to transmit the channel estimation signal.

3. The communication system according to claim 2, wherein the number of carriers assigned to transmit the channel estimation signal is more than or equal to the number of contiguous areas to the each area.

4. The communication system according to claim 1, wherein the mobile subscriber stations transmit the channel estimation signal, using a spreading code that is assigned to each of the mobile subscriber stations among mutually orthogonal spreading codes.

5. The communication system according to claim 1, wherein the mobile subscriber stations transmit the channel estimation signal, using a Gold code that is assigned to each of the mobile subscriber stations.

6. The communication system according to claim 1, wherein, when an interference amount at the adjacent mobile subscriber station exceeds a predetermined threshold value, the base station transmits the data, using the transmission beam that is directed to the mobile subscriber station and is not directed to the adjacent mobile subscriber station.

7. The communication system according to claim 1, wherein the channel estimation signals received from each of the adjacent mobile subscriber stations represents a transmission channel between the adjacent mobile subscriber station and the base station.

8. A communication system comprising:
a plurality of base stations; and
mobile subscriber stations located respectively in areas corresponding to the plurality of base stations,
wherein each mobile subscriber station in each area transmits a channel estimation signal to each base station corresponding to the area and to base stations corresponding to areas contiguous to the area, and each of the base stations transmits data to the mobile subscriber stations using a transmission beam that is directed to the mobile subscriber stations in the corresponding area and is not directed to adjacent mobile subscriber stations in the areas contiguous to the corresponding area, the data being transmitted by the base stations to the mobile subscriber stations on the basis of
the channel estimation signal received from the mobile subscriber station in an area corresponding to the base station, and
the channel estimation signals received from the adjacent mobile subscriber stations in the areas contiguous to the area corresponding to the base station that are outside of the area corresponding to the base station,
wherein the base station obtains information about transmission timings at which data is transmitted to the mobile subscriber station and the adjacent mobile subscriber stations so as to find out whether the adjacent mobile subscriber stations simultaneously receive data which the base station transmits to the mobile subscriber station, and if the base station finds out the simultaneous data reception, the base station transmits the data to the mobile subscriber station, using a transmission beam that is directed to the mobile subscriber station and is not directed to the adjacent mobile subscriber stations.

9. The communication system according to claim 8, wherein the base station obtains from a base station controller that controls the base station, the information about transmission timings at which data is transmitted to the mobile subscriber station and the adjacent mobile subscriber stations.

10. The communication system according to claim 8, wherein the base station obtains data transmission timings of the mobile subscriber station and the adjacent mobile subscriber stations, from the mobile subscriber station and the adjacent mobile subscriber stations.

11. A communication system comprising:
a plurality of base stations; and
mobile subscriber stations located respectively in areas corresponding to the plurality of base stations,
wherein each mobile subscriber station in each area transmits a channel estimation signal to each base station corresponding to the area and to base stations corresponding to areas contiguous to the area, and each of the base stations transmits data to the mobile subscriber stations using a transmission beam that is directed to the mobile subscriber station and is not directed to adjacent mobile subscriber stations, on the basis of the channel estimation signal received from the mobile subscriber station in an area corresponding to the base station and the channel estimation signals received from the adjacent mobile subscriber stations in areas contiguous to the area corresponding to the base station, and wherein, when an interference amount at the adjacent mobile subscriber station exceeds a predetermined threshold value, the base station transmits the data, using the transmission beam that is directed to the mobile subscriber station and is not directed to the adjacent mobile subscriber station.

12. A base station for a communication system that includes a plurality of said base stations and mobile subscriber stations located respectively in areas corresponding to the plurality of said base stations, each mobile subscriber station in each area transmitting a channel estimation signal to each said base station corresponding to the area and to base stations corresponding to areas contiguous to the area, wherein:
said base station transmits data to the mobile subscriber stations using a transmission beam that is directed to the mobile subscriber stations in the corresponding area and is not directed to adjacent mobile subscriber stations in the areas contiguous to the corresponding area, the data being transmitted by the base station to the mobile subscriber stations on the basis of
the channel estimation signal received from the mobile subscriber station in an area corresponding to said base station,
the channel estimation signals received from the adjacent mobile subscriber stations in the areas contiguous to the area corresponding to said base station that are outside of the area corresponding to said base stations, and
an interference amount at the adjacent mobile subscriber stations in the areas contiguous to the area corresponding to the base station.

* * * * *